United States Patent
Stirtz

(10) Patent No.: US 10,456,904 B1
(45) Date of Patent: Oct. 29, 2019

(54) RETRIEVABLE DROPPED REACHER DEVICE

(71) Applicant: Ronald H. Stirtz, Creswell, OR (US)

(72) Inventor: Ronald H. Stirtz, Creswell, OR (US)

( * ) Notice: Subject to any disclaimer, the term of this patent is extended or adjusted under 35 U.S.C. 154(b) by 0 days.

(21) Appl. No.: 16/350,507

(22) Filed: Nov. 20, 2018

(51) Int. Cl.
  *B25J 1/04* (2006.01)
  *A47F 13/06* (2006.01)

(52) U.S. Cl.
  CPC ............. *B25J 1/04* (2013.01); *A47F 13/06* (2013.01)

(58) Field of Classification Search
  CPC .. B25J 1/02; B25J 1/04; B25J 15/0095; A47F 13/06; B25G 1/00; B25G 1/10; B25G 1/102; A45B 1/00; A45B 9/00; A45B 9/02
  USPC .............. 294/131, 209, 210, 211; 254/131.5; 135/65, 66, 77, 84
  See application file for complete search history.

(56) References Cited

U.S. PATENT DOCUMENTS

| | | | | |
|---|---|---|---|---|
| 2,807,495 A | * | 9/1957 | Pillstrom | A01K 15/003 119/807 |
| 3,669,487 A | * | 6/1972 | Roberts | B25B 7/00 294/104 |
| 4,441,746 A | * | 4/1984 | Corboy, Jr. | B25B 9/00 294/115 |
| 4,962,957 A | * | 10/1990 | Traber | B25J 1/04 294/100 |
| 5,433,234 A | * | 7/1995 | Lapere | A45B 3/00 135/66 |
| 6,220,262 B1 | * | 4/2001 | Hasebe | A45B 1/04 135/65 |

* cited by examiner

*Primary Examiner* — Dean J Kramer
(74) *Attorney, Agent, or Firm* — Robert E. Howard

(57) ABSTRACT

A reacher device retrievable from a dropped surface including a jaw assembly located at its distal end and a handle assembly located at its proximal end. The handle assembly includes a trigger communicating with the jaw assembly and configured to move the jaws of the jaw assembly from their spaced apart resting mode towards each other. A retrieval pivot member is attached to the handle and includes at least one fulcrum surface configured to contact the dropped surface. The fulcrum surface contacts the dropped surface on both sides of the handle assembly to stabilize the handle assembly against side-to-side movement, and is configured to pivot the distal end of the dropped reacher device upwardly to a position where it can be grasped by a user upon depression of the handle assembly toward the dropped surface.

5 Claims, 4 Drawing Sheets

US 10,456,904 B1

RETRIEVABLE DROPPED REACHER DEVICE

BACKGROUND OF THE INVENTION

The present invention elates to a reacher device that can be easily retrieved by the user when it has been dropped.

Reacher devices are used by people who have difficulty bending down to pick up an object located on the floor or ground. Although there are various types of reacher devices they typically have spaced apart jaws located at the distal end of an elongated shaft that can be brought together by manual actuation of a trigger mechanism located at the proximal, handle end of the shaft to thereby grasp an object. The grasped object can then be raised into a position to allow a user to retrieve it by manual deactivation of the trigger mechanism which allows the jaws to open.

There are two main types of reacher devices that are commonly available.

A first type of reacher employs a pistol grip type handle having a pivotable trigger extending downwardly in front of the handle that is attached to the spaced apart jaws in a manner to allow the jaws to be brought towards each other upon the user pivoting the trigger toward the handle. This type of reacher will hereinafter be referred to as the "pivotal trigger type".

A second type of reacher employs a handle frame having a sliding handle member located therein which is attached to the spaced apart jaws in a manner to allow the jaws to be moved towards each other upon movement of the slidable handle member toward the user. This type of reacher will hereinafter be referred to as the "slidable trigger type".

It is not unusual for a user to drop their reacher device onto the floor or ground which makes its retrieval by the user problematic.

SUMMARY OF THE INVENTION

It is an object of the present invention to provide a reacher device having retrieval pivot means to allow the reacher device to be easily retrieved by the user when it is accidentally dropped onto a floor or ground (the "dropped surface").

The retrievable pivot means of the present invention is attached to the handle of the reacher. The retrievable pivot means includes at least one fulcrum surface configured to contact the dropped surface from which the teacher device is to be retrieved. The fulcrum surface contacts the dropped surface on both sides of the handle assembly to thereby stabilize the handle assembly against side-to-side movement, and is configured to pivot the distal end of the reacher device upwardly to a position where it can be grasped by the user upon depression of the handle assembly toward the dropped surface.

In the pivotal trigger type reacher the retrieval pivot member is an inverted, generally U-shaped assembly having an elongated base member having first and second ends, and first and second side members extending downwardly from the first and second ends of the elongated base member, respectively. The base of the U-shaped retrieval pivot member is attached to the top of the handle of the reacher. The side members are substantially parallel, and extend downwardly at a substantially right angle to the base member. If the reacher is dropped onto the floor or ground it will either be positioned with the outer surface of the major plane of the base of the pivot member resting against the floor or ground, or with the outer surface of the major plane of the base not resting on the floor or ground. If the outer surface of the base is not resting on the dropped surface the user can use his/her foot to move the pivot member so that the outer surface of its base is resting on the dropped surface. The user can then depress the handle of the reacher with his/her foot to cause the reacher to pivot about the base and raise the distal end of the reacher to a height reachable by the user. The sides of the retrieval pivot member act as stop members to prevent the reacher from being raised too far, where it could tip over.

In the slidable trigger type reacher, the retrieval pivot member includes a pair of substantially semi-circular plates. Each plate is attached to one side of the handle frame, the major planes of the plates being substantially parallel to each other and substantially perpendicular to the longitudinal axis of the slidable trigger. If the dropped reacher rests with one plate abutting the dropped surface it can be tipped over with the user's foot so that the semi-circular edges of both plates rest against the dropped surface. The user then depresses the handle portion of the handle frame with his/her foot toward the dropped surface to cause the distal end of the reacher to rotate upwardly to a location where it can be grasped by the user.

DESCRIPTION OF PREFERRED EMBODIMENTS

Figure 1:
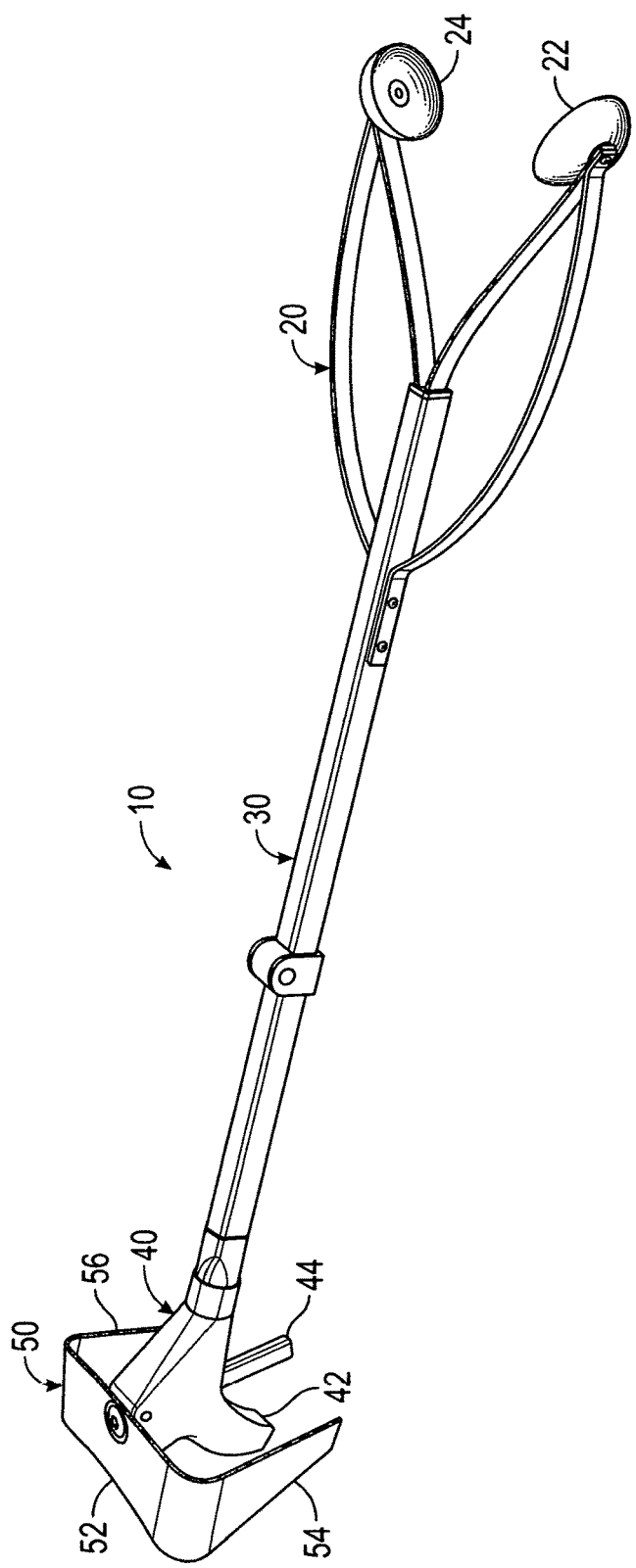
FIG. 1 is a view of a pivotal trigger type reacher showing a first embodiment of the retrieval mechanism of the present invention thereon.
Figure 2:
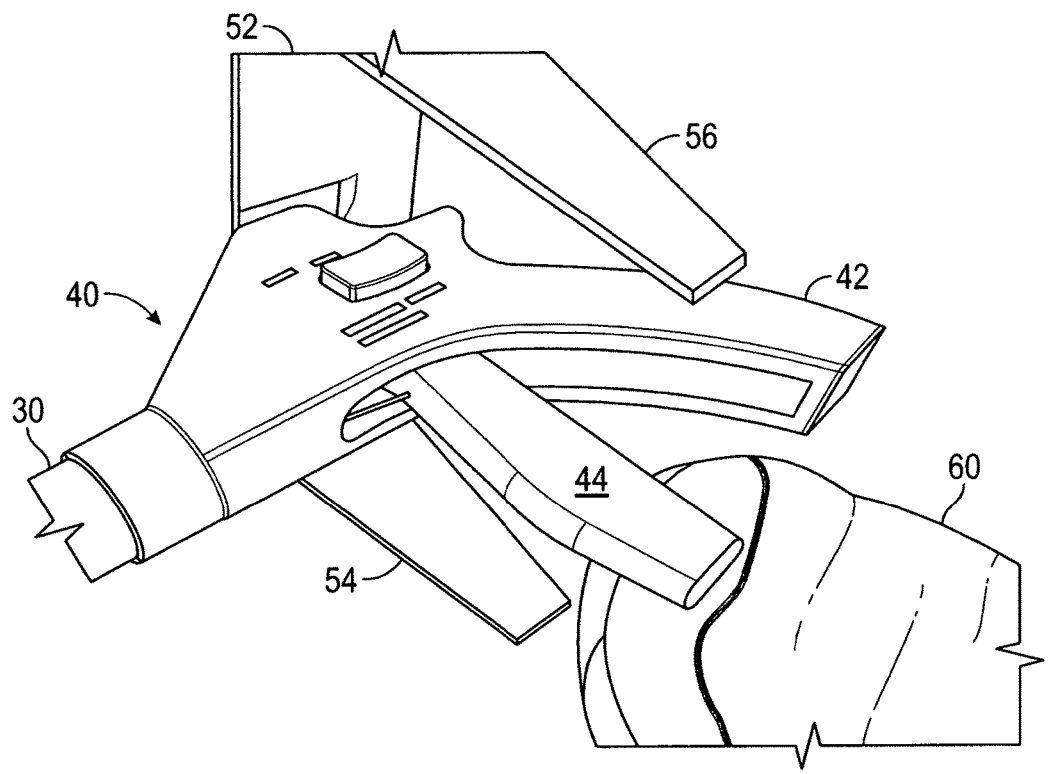
FIG. 2 is an enlarged view of the proximal, trigger end of the pivotal trigger type reacher of FIG. 1 showing it being righted for raising by a user's foot.
Figure 3:
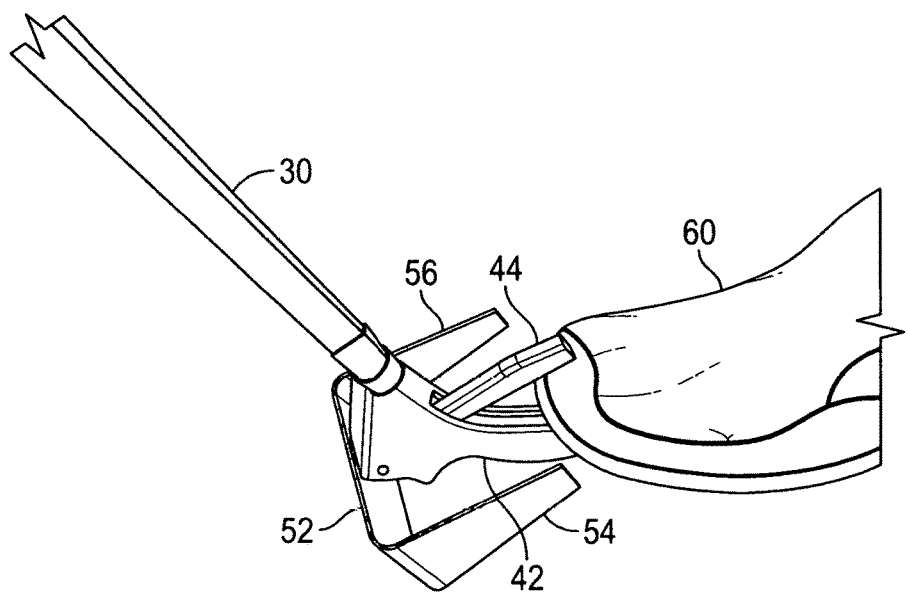
FIG. 3 is an enlarged view of the proximal, trigger end of the pivotal trigger type reacher of FIG. 1 showing a user's foot pivoting the distal end of the reacher upwardly for retrieval.

The pivotal trigger type reacher device 10 shown in FIGS. 1-3 is comprised of a jaw assembly 20 located at the distal end of elongated shaft 30. A handle assembly 40 is located at the proximal end of elongated shaft 30.

Jaw assembly 20 includes jaws 22 and 24. Jaws 22 and 24 are normally spaced apart, as shown in FIG. 1.

Handle assembly 40 includes a pistol grip 42 and a pivotal trigger 44 located in front of pistol grip 42. Trigger 44 communicates with jaw assembly 20 with any of the several types of mechanisms known in the prior art that are adapted to bring jaws 22 and 24 towards each other upon the user manually pulling trigger 44 towards handle 42, and to release jaws 22 and 24 back to their spread apart configuration upon release of trigger 44 by the user. See, for example, U.S. Pat. No. 4,441,746.

Attached to the top handle assembly 40 is retrieval pivot assembly 50. Retrieval pivot assembly 50 is generally an inverted U-shaped member having an elongated, substantially rectangular base 52 and first and second side members 54 and 56 formed integral therewith or attached thereto. The major planes of first and second side members 54 and 56 are substantially parallel to each other, and substantially perpendicular to the major plane of base 52. First and second side members 54 and 56 extend downwardly to substantially surround handle assembly 40. Base 52 is substantially rectangular in shape and extends beyond both sides of handle assembly 40.

If reacher 10 is dropped by the user, and lands on the outer planar surface of first side member 54, as shown in FIG. 2, the user can re-position it to have the outer planar surface of base 52 in contact with the dropped surface and both sides 54 and 56 pointing upwardly (as shown in FIG. 3) by using his/her foot 60 to push against trigger 44. If the reacher 10 falls onto the outer planar surface of second side 56, the same procedure would be used by the user to re-position it.

If reacher 10 falls on the tips of both side members 54 and 56, as seen in FIG. 1, it can be first tipped to reside on the outer planar surface of side member 54 (as seen in FIG. 2) or the outer planar surface of side member 56 (not shown), and then tipped from that position to bring base 52 into contact with the dropped surface and then raised as shown in FIG. 3.

If reacher 10 falls onto the outer planar surface of base 52, no re-positioning is required.

Having the outer planar surface of base 52 of retrieval pivot assembly 50 in contact with the dropped surface stabilizes handle 40 against side-to-side movement during retrieval of reacher 10.

With retrieval pivot assembly 50 positioned so that the outer planar surface of base 52 is in contact with the dropped surface the user can then depress pistol grip 42 with his/her foot 60, as seen in FIG. 3. Upon depressing pistol grip 42, jaw assembly 20 and the distal end of shaft 30 are raised upwardly by virtue of the fulcrum action exerted by retrieval pivot assembly 50. First and second side members 54 and 56 act as stop members to prevent shaft 30 and attached jaw assembly 20 from tipping over.

Figure 4:
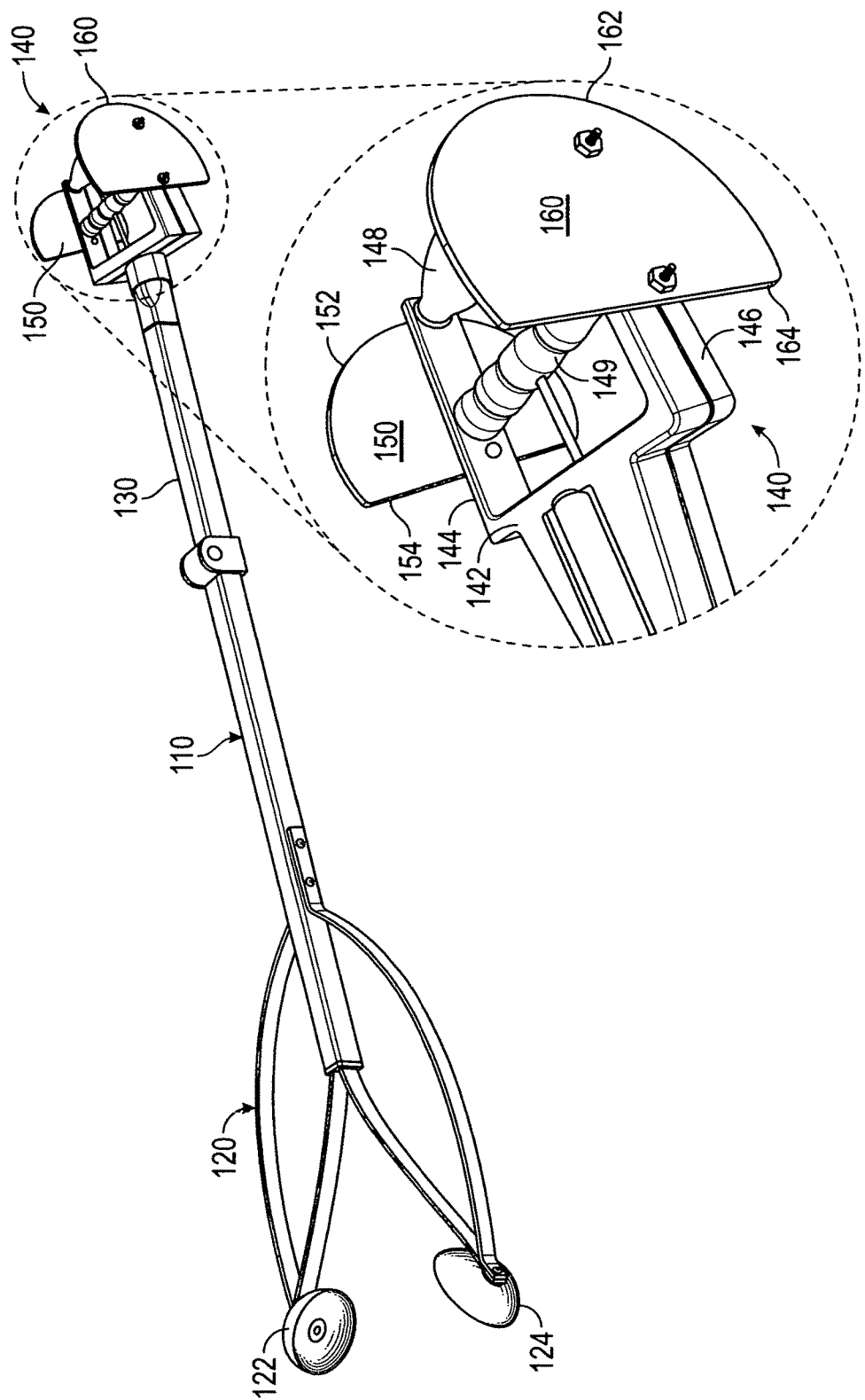
FIG. 4 is a view of a slidable trigger type reacher showing a second embodiment of the retrieval pivot mechanism of the present invention thereon.
Figure 5:
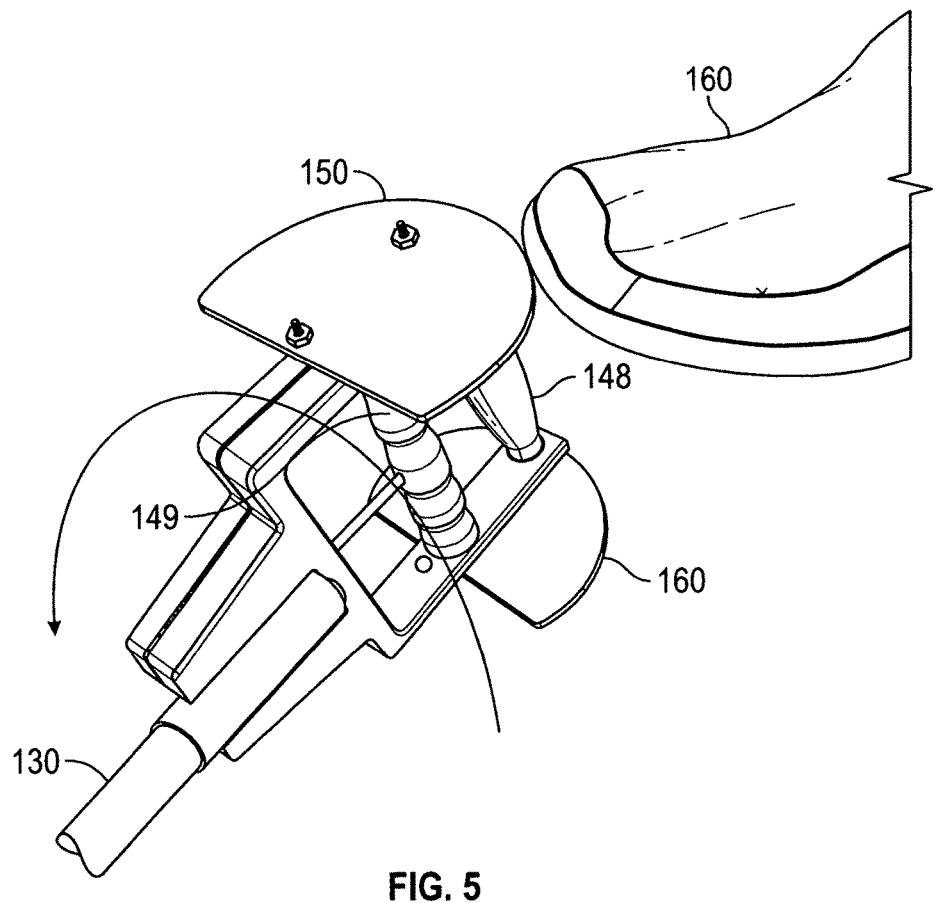
FIG. 5 is an enlarged view of the proximal, trigger end of the slidable trigger type reacher of FIG. 4 showing it being righted for raising by a user's foot.
Figure 6:
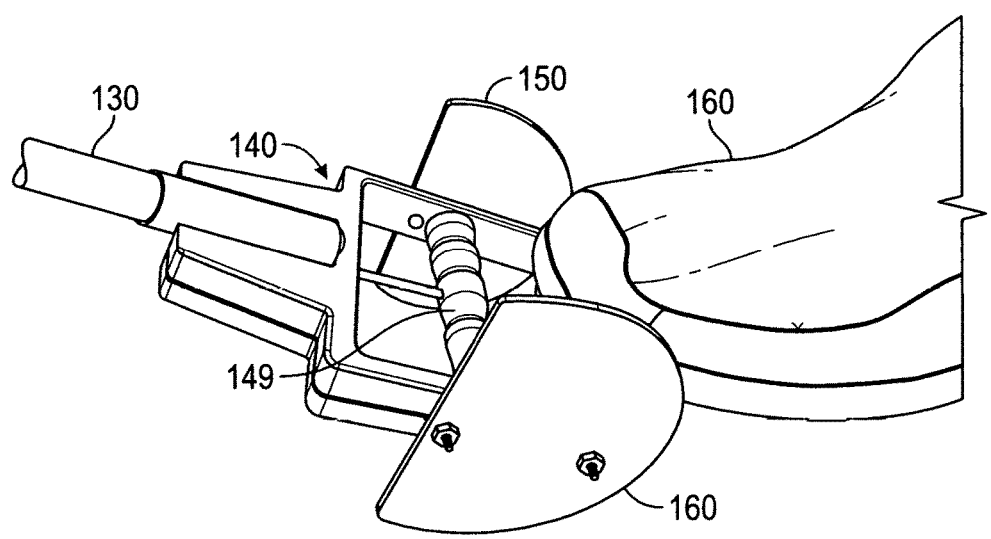
FIG. 6 is an enlarged view of the proximal trigger end of the slidable trigger type reacher of FIG. 4 showing a user's foot pivoting the distal end of the reacher upwardly for retrieval.

The slidable trigger type reacher device 110 is shown in FIGS. 4-6 and is comprised of a jaw assembly 120 located at the distal end of elongated shaft 130. A handle assembly 140 is located at the proximal end of elongated shaft 130.

Jaw assembly 120 includes jaws 122 and 124. Jaws 122 and 124 are normally spaced apart, as shown in FIG. 4.

Handle assembly 140 includes a generally U-shaped open frame having a bottom cross member 142 and first and second side members 144 and 146 extending upwardly from the first and second ends of bottom cross member 142. First and second side members 144 and 146 are generally parallel to each other, and generally perpendicular to bottom cross member 142. A handle 148 extends between the upper ends of first and second side members 144 and 146.

A movable trigger member 149 extends between first and second side members 144 and 146. Trigger member 149 communicates with jaw assembly 120 with any of the several types of mechanisms known in the prior art that are adapted to bring jaws 122 and 124 towards each other upon the user manually pulling trigger 149 towards handle 148, and to release jaws 122 and 124 back to their spread apart configuration shown in FIG. 4 upon release of trigger 149 by the user.

The retrieval pivot assembly of slidable trigger type reacher 110 is comprised of first and second pivot plates 150 and 160 attached to the outsides of first and second side members 144 and 146, respectively, of handle assembly 140.

First and second pivot plates 150 and 160 are substantially semi-circular in shape and are substantially identical in shape and size. Pivot plate 150 has a curved, semi-circular portion 152 ending in a flat edge 154. Pivot plate 160 has a curved, semi-circular portion 162 ending in a flat edge 164.

Pivot plates 150, 160 have substantially parallel major planes. The major planes of first and second pivot plates 150, 160 are substantially perpendicular to the longitudinal axis of slidable trigger member 149.

An imaginary line extending between the apex of the circular portions 152, 162 of first and second pivot plates 150 and 152 and the mid-portion of the flat, base portions 154 and 156 of each of first and second pivot plates 150 and 160 are substantially parallel to the longitudinal axes of first and second side members 144 and 146, and all three lie substantially in the same plane.

If upon falling to the dropped surface reacher 110 is lying on either one of the planar surfaces of first and second plates 150 or 160 (as seen in FIG. 5), it can be re-positioned into the configuration shown in FIGS. 4 and 6 with each of the semi-circular circular portions of the plates being brought into contact with the dropped surface by the user pushing the upward facing plate with his/her foot 160, as seen in FIG. 5. From the position shown in FIG. 4 the user can then push against handle 148 with his/her foot, as shown in FIG. 6, to raise the distal end of reacher 110 to a height where the user can retrieve it due to plates 150 and 160 acting as fulcrums.

The diameters of first and second semi-circular plates 150, 160 are selected based upon the length of elongated shaft 130 and the distance it is desired to raise the distal end of reacher 110 to allow it to be grasped by the user in accordance with the well known mathematics of levers and fulcrums.

It will be obvious to those having skill in the art that many changes may be made to the details of the above-described embodiments of his invention without departing from the underlying principles thereof. The scope of the present invention should, therefore, be determined only by the following claims.

The invention claimed is:

1. A reacher device that allows a user to retrieve it from a dropped surface upon which it has fallen comprising:

an elongated shaft having a longitudinal axis and a proximal end and a distal end;

said elongated shaft including a jaw assembly located at its distal end and a handle assembly located at its proximal end;

said jaw assembly including a pair of jaws that are spaced apart in a resting mode and spaced adjacent each other in a fully actuated mode;

said handle assembly including a trigger communicating with said jaw assembly and configured to move said jaws from said resting mode toward said fully actuated mode upon movement of said trigger toward a user, said handle assembly including a pistol grip extending downwardly from said longitudinal axis of said elongated shaft and said trigger is spaced in front of said pistol grip; and retrieval pivot means attached to said handle assembly, said retrieval pivot means including at least one fulcrum surface configured to contact a dropped surface from which said reacher device is to be retrieved, said at least one fulcrum surface contacting said dropped surface on both sides of said handle assembly to thereby stabilize said handle assembly against side-to-side movement and configured to pivot said distal end of said reacher device upwardly to a position where it can be grasped by a user upon depression of said handle assembly toward said dropped surface, said retrieval pivot means including an inverted, generally U-shaped assembly including an elongated base member having first and second ends, said base member being attached to the top of said handle assembly in a configuration to provide contact between its outer surface and a dropped surface, said first and second ends of said base member extending beyond said handle assembly, and first and second side members extending downwardly from said first and second ends of said base member.

2. A reacher device that allows a user to retrieve it from a dropped surface upon which it has fallen comprising:
   an elongated shaft having a longitudinal axis and a proximal end and a distal end;
   said elongated shaft including a jaw assembly located at its distal end and a handle assembly located at its proximal end;
   said jaw assembly including a pair of jaws that are spaced apart in a resting mode and spaced adjacent each other in a fully actuated mode;
   said handle assembly including a trigger communicating with said jaw assembly and configured to move said jaws from said resting mode toward said fully actuated mode upon movement of said trigger toward a user, said handle assembly including a generally U-shaped open frame having a bottom cross member having first and second ends, first and second side members extending upwardly from said first and second ends of said bottom cross member, respectively, and a handle extending between upper ends of said first and second side members, said trigger being slidably positioned between said first and second side members of said handle assembly frame; and
   retrieval pivot means attached to said handle assembly, said retrieval pivot means including at least one fulcrum surface configured to contact a dropped surface from which said reacher device is to be retrieved, said at least one fulcrum surface contacting said dropped surface on both sides of said handle assembly to thereby stabilize said handle assembly against side-to-side movement and configured to pivot said distal end of said reacher device upwardly to a position where it can be grasped by a user upon depression of said handle assembly toward said dropped surface, said retrieval pivot means including first and second plate members attached to said first and second side members of said handle assembly frame, each of said first and second plate members having an abutment edge configured to contact a dropped surface throughout said upward movement of said distal end of said reacher device during retrieval.

3. The reacher device of claim 2 wherein said first and second plate members are substantially identical in shape, the abutment edge of each being substantially semi-circular.

4. The reacher device of claim 3 wherein each of said first and second plate members have major planes that are substantially parallel.

5. The reacher device of claim 3 wherein the diameters of said semi-circular first and second plate members of said retrieval pivot means are selected to allow said distal end of said reacher device to be pivoted to a height to allow it to be grasped by a user.

* * * * *